Sept. 27, 1960 A. H. KARSA 2,953,820
PREPARATION OF BRISTLE MATERIAL
Filed June 12, 1956 2 Sheets-Sheet 1
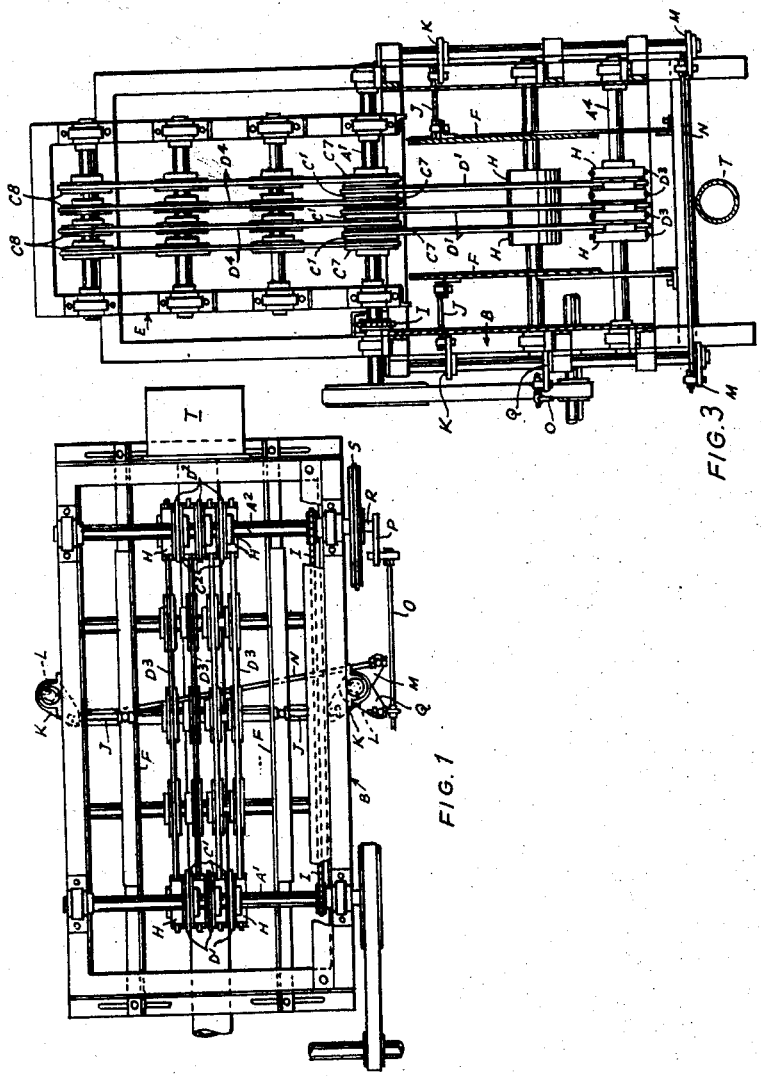
Inventor
Anthony H. Karsa
by
Attorney Sept. 27, 1960      A. H. KARSA      2,953,820
PREPARATION OF BRISTLE MATERIAL
Filed June 12, 1956      2 Sheets-Sheet 2
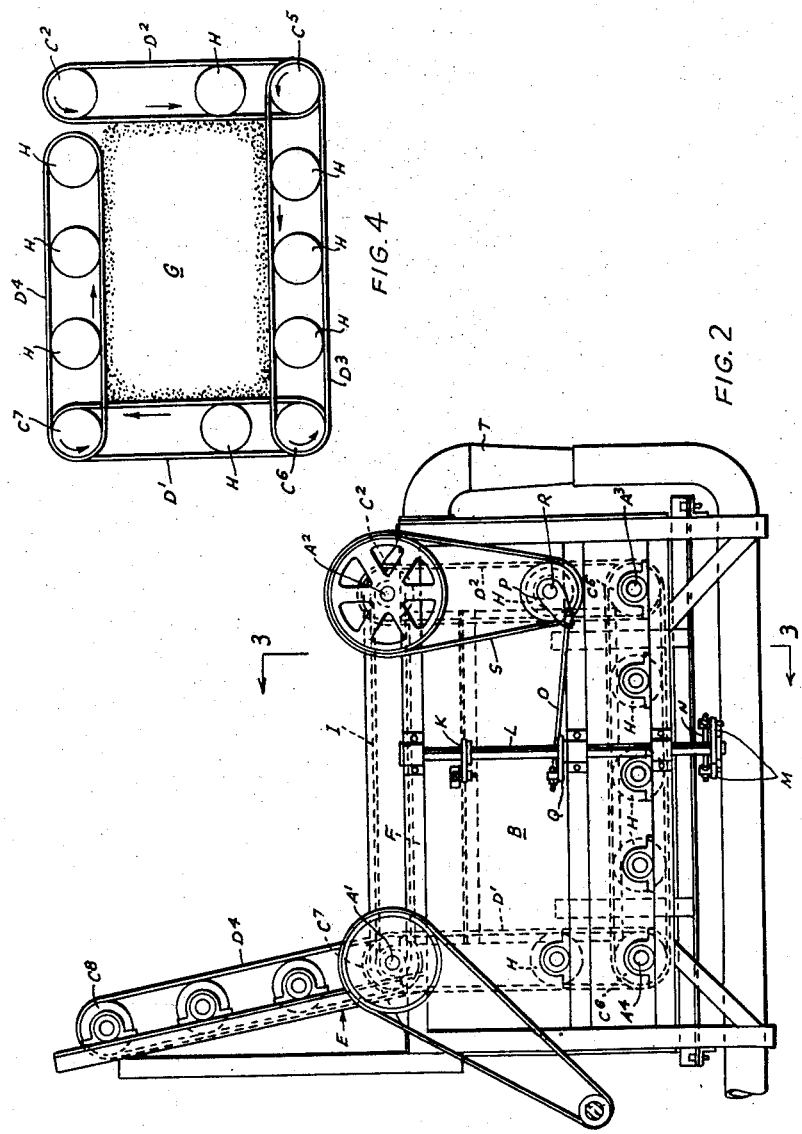
Inventor
Anthony H. Karsa
by
Attorney United States Patent Office 2,953,820
Patented Sept. 27, 1960

2,953,820

PREPARATION OF BRISTLE MATERIAL

Anthony Herbert Karsa, Stockport, England, assignor to Herbert Rushworth & Company Limited, Stockport, England, a British company Filed June 12, 1956, Ser. No. 590,919

Claims priority, application Great Britain June 14, 1955

7 Claims. (Cl. 19—65)

This invention relates to the preparation of thread-like materials of animal, vegetable or synthetic origin for use in the manufacture of brushes and brooms, being particularly, though not exclusively, applicable to the piassava, bassine, coconut and similar fibres at present employed either alone or in conjunction with animal bristles.

In the raw state, the above-mentioned vegetable fibres tend (except when of "prime" grade and hence too expensive for most purposes) to be of angular cross-section, rough-surfaced, and mingled with adherent corky matter, dead fibres, and other trash which it is desirable to remove before the material is made up into tufts for insertion into the stocks of brushes or brooms.

Furthermore, it is usual to mix together fibres of two or more different varieties in order to obtain the required characteristics in the finished tuft, and such mixing is at present commonly effected by scattering the fibres in the desired proportions after they have been cut to length, the resultant loose heap being then gathered up and further manually treated to draw and comb the fibres into approximate parallelism.

It is also normal practice manually to mix pre-cut fibres of different kinds in the apropriate proportions and thereafter to submit the resultant batch to prolonged treatment in a mixing machine comprising a plurality of endless travelling bands across which the fibres are laid in a layer of suitable thickness and thereby conveyed into pressure contact with a series of rollers driven at graduated speeds so that the layer is progressively reduced in thickness as it travels. At the rear end of the machine, the layer of fibres passes on to a carriage reciprocating beneath the rollers aforesaid and adapted progressively to restore the layer to its original thickness at a point where it becomes engaged between an endless apron and the bands above-mentioned, for recirculation by the latter.

This known form of machine has an efficient mixing action, and the relative movement of the individual fibres as the layer is alternately thinned and thickened by the machine, combined with the shaking imparted to such fibres by means of guide plates vibrated in contact with their ends, serves to remove a considerable quantity of dust and other waste matter.

Nevertheless, if fibres of ordinary grade are used, their mixing by the means aforesaid leaves them very much in their original rough-surfaced condition, and still of more or less angular cross-section, so that a brush or broom tufted therewith is not self-clearing.

The object of the present invention is to provide a simple but effective method of, and means for, removing the adherent corky matter and associated trash from ordinary-grade fibres so that the latter rapidly acquire the clean, smooth surfaces and substantially round sections characteristic of the "prime" grade material.

The method according to this invention involves closely constraining a bundle of fibres to a non-circular cross-section and moving the constraining surfaces so that the fibres in contact therewith tend to be rotated in a common direction and the whole outer layer of such fibres to be correspondingly circulated with reference to the longitudinal axis of the bundle.

It will be appreciated that, owing to the confinement of the bundle, inwardly disposed constituents thereof are directly or indirectly rotated by the frictionally driven outermost fibres, with consequent mutual attrition of oppositely-rotating contiguous fibres, the non-cylindrical configuration of the outer layer causing different parts thereof to oscillate radially within the bundle as such layer is bodily circulated and thereby effecting a progressive rearrangement of the constituent fibres throughout the whole cross-section of the bundle.

In the accompanying drawings:

Fig. 1 is a top plan view of one form of machine for carrying the method aforesaid into effect.

Fig. 2 is a side elevation of the machine with a movable upper part thereof (not shown in Fig. 1) raised to permit introduction of a bundle of untreated fibres.

Fig. 3 is a section on the line 3—3 of Fig. 2, and

Fig. 4 is a diagrammatic side elevation showing the machine operating upon a bundle of fibres.

In the machine illustrated, four horizontal and mutually-parallel shafts $A^1$, $A^2$, $A^3$ and $A^4$ are rotatably mounted upon a main stationary frame B with their axes at the corners of an approximately rectangular figure, each of the two upper shafts $A^1$, $A^2$ having fixed thereto a set of three pulleys ($C^1$ and $C^2$, respectively) which are connected by vertically-running belts or ropes ($D^1$ and $D^2$, respectively) to corresponding pulleys on the shaft ($A^4$ and $A^3$, respectively) below it. Alternated with the pulleys on the lower shafts $A^4$, $A^3$ are four more fixed pulleys ($C^6$, $C^5$ respectively), which are connected by horizontally-running belts or ropes $D^3$, the inner runs of the three sets of belts or ropes $D^1$, $D^3$, $D^2$ respectively defining three sides of the rectangular figure aforesaid.

Similar additional pulleys $C^7$ alternated with the three pulleys $C^1$ on the upper shaft $A^1$ are connected by belts or ropes $D^4$ to a fifth pulley assembly $C^8$ mounted at the free end of a frame E which is pivoted about the axis of the shaft $A^1$, this frame being so dimensioned, and normally so disposed, that the inner runs of its belts or ropes complete the rectangular figure aforesaid.

It should be understood that the sides of such rectangular figure need not necessarily be vertical and horizontal, that the number of belts or ropes employed is optional, and that such belts or ropes employed is optional, and that such belts or ropes may be replaced by chains running over sprockets.

Upright metal plates F are provided within the frame B to form opposite ends of a fibre container whose lid is represented by the pivoted frame E, such plates being disposed parallel to one another and vibrated by suitable means, hereinafter described, which permit the adjustment of such plates towards or away from one another.

In using the machine for treating vegetable fibres and for mixing (say) two types of the latter together, pre-cut fibres G of both types are deposited in the required proportions in the container aforesaid until it is substantially filled (see Fig. 4), the pivoted frame E, which may be suitably loaded, being then lowered so that its belts or ropes $D^4$ rest on the top of the bundle and the plates F being adjusted into contact with the ends of the resultant bundle. The bundle is thus confined within the four sets of belts ropes or chains $D^1$, $D^4$, $D^2$, $D^3$ whose inner runs are preferably supported by idle rollers H between the several sets of pulleys or sprockets.

One of the four shafts (for example, the shaft $A^1$) is driven by any suitable means, such as an electric motor, and drives at least one other shaft (for example, $A^2$) by means of a chain I, with the result that the several sets of belts, ropes or chains tend to cause unidirectional rotation of the outermost fibres G in contact therewith, each such fibre in turn tending to rotate inwardly-disposed contiguous fibres and so on towards the centre of the bundle.

At the same time, as clearly shown in Fig. 4, the travelling belts, ropes or chains D¹, D⁴, D², D³ impart a circulatory movement to the whole outer layer of fibres G in the same direction as that in which the outermost fibres are frictionally driven, any given fibre tending to circulate within the bundle whilst having an overall motion around the periphery of the latter.

This effect, coupled with the non-cylindrical configuration of the bundle which periodically causes the circulating fibres to traverse its central portion, results in a very efficient mixing action, and if distinctively coloured fibres are introduced these will be found uniformly distributed throughout the whole volume of the bundle.

Furthermore, since each fibre is continually rolling in pressure contact with others, it is rapidly cleaned of any adherent corky matter and its edges are ground away so that there is eventually produced a smooth surfaced fibre of substantially uniform circular section.

The waste matter produced by the mutual attrition of the numerous fibres G gravitates through the bundle into a suitable collector its separation preferably being assisted by continuous vibration of the plates F which confine the ends of the bundle.

In the convenient arrangement shown, these plates F are oscillated about mutually-parallel horizontal axes by means of adjustable links J connecting them to crank arms K on vertical rock-shafts L at opposite sides of the frame B, such shafts carrying further arms M which are linked by a connecting rod N so as to turn in opposite directions when one of them is oscillated through the medium of a further link O and crank arms P, Q from a cross-shaft R. This latter may be driven by a belt S from one of the main shafts; for example, the shaft A².

The lighter particles or dust resulting from operation of the machine may be removed by means of any suitable air-extraction plant, whose intake ducting is indicated at T.

It has been found, however, that a rectangular container of the proportions illustrated (i.e. one having a length approximately twice its height) tends, other things being equal, to result in quicker and more satisfactory treatment of the fibres than any other shape.

I claim:

1. A machine for treating fibres to be used in the manufacture of bristles or brooms, characterised by means for closely constraining a bundle of such fibres to a non-circular cross-section and for moving the constraining surfaces so that the fibres in contact therewith tend to be rotated about their axes in a common direction and the whole outer layer of such fibres to be correspondingly circulated with reference to the longitudinal axis of the bundle, further characterised in that some at least of the bundle-constraining surfaces are represented by sets of endless constraining surfaces adapted for continuous circulation in mutually parallel planes.

2. A machine for treating fibers to be used in the manufacture of bristles or brooms, characterized by means for closely constraining a bundle of such fibers to a non-circular cross-section and for moving the constraining surfaces so that the fibers in contact therewith tend to be rotated about their axes in a common direction and the whole outer layer of such fibers to be correspondingly circulated with reference to the longitudinal axis of the bundle, and further characterised in that the surfaces aforesaid collectively define a rectangular fibre container whose ends are represented by plates adjustable to suit the length of the bundle.

3. A machine according to claim 2, further characterised in that the constraining surfaces are designed to provide a container having a length approximately twice its height.

4. A machine according to claim 1, further characterised in the presence of a container for said fibres, and a set of said endless constraining surfaces forming a lid for said container, and that set forming the lid of the fibre container is carried by a pivoted frame which can be raised to permit loading or removal of the fibres.

5. A machine according to claim 4, further characterised in that pulleys associated with each set of constraining surfaces are fixed to a common shaft alternatively with further pulleys carrying the next set of belts.

6. A machine according to claim 2, further characterised in that the end plates aforesaid are adapted for continuous vibration during movement of the bundle-constraining surfaces.

7. A machine according to claim 6, further characterised by rock-shafts driven from one of the main shafts and each carrying a crank arm connected to one of the end plates by an adjustable link.

References Cited in the file of this patent

UNITED STATES PATENTS

| 1,129,167 | Chase | Feb. 23, 1915 |
| 2,365,793 | Asbill et al. | Dec. 26, 1944 |

FOREIGN PATENTS

| 57,336 | Austria | Sept. 1, 1912 |
| 376,626 | Germany | June 4, 1923 |